United States Patent [19]

Taig

[11] 4,263,817
[45] Apr. 28, 1981

[54] SUPPORT MEMBER FOR RACK AND PINION ASSEMBLY

[75] Inventor: Alistair G. Taig, South Bend, Ind.

[73] Assignee: The Bendix Corporation, Southfield, Mich.

[21] Appl. No.: 54,207

[22] Filed: Jul. 2, 1979

[51] Int. Cl.³ .................. F16H 19/04; B62D 3/12
[52] U.S. Cl. ................................................ 74/422
[58] Field of Search .............. 74/410, 422, 427, 424.6, 74/406, 411, 89.17, 492

[56] References Cited

U.S. PATENT DOCUMENTS

| 3,623,379 | 11/1971 | Bradshaw et al. ............... 74/422 X |
| 3,747,429 | 7/1973 | Cass .................................... 74/492 |
| 3,752,007 | 8/1973 | Blondeleau et al. ................ 74/492 |

FOREIGN PATENT DOCUMENTS 949061  2/1964 United Kingdom.
1451143 9/1976 United Kingdom.
2013304 8/1979 United Kingdom.

Primary Examiner—C. J. Husar
Assistant Examiner—Conrad Berman
Attorney, Agent, or Firm—Paul David Schoenle; Ken C. Decker

[57] ABSTRACT

A rack and pinion steering assembly includes a housing with a first bore for rotatably receiving the pinion and a second bore for movably receiving the rack. A support member slidably engages the rack and includes a pair of arms opposing the wall of the first bore to prevent separation of the support member and rack away from the pinion. A resilient cooperates with one of the arms to bias the support member to pivot about the other arm. An optional ring cooperates with the other arm to adjust the position of the support member and the rack to take up wear between the rack and pinion or between the rack and support member.

14 Claims, 4 Drawing Figures

SUPPORT MEMBER FOR RACK AND PINION ASSEMBLY

BACKGROUND OF THE INVENTION

A rack and pinion assembly includes a housing with a first bore for rotatably receiving the pinion and a second bore for movably receiving the rack. In order to maintain the rack fully engaged with the pinion, a support member is slidably engageable with the rack and biased toward the pinion to yieldably resist separation between the rack and the pinion.

The housing includes a boss with a bore for receiving the support member. A plug closing the boss bore cooperates with an adjuster assembly to take up clearances due to wear between the rack and the pinion. Consequently, the housing requires modification to make room for the support member and its adjuster assembly. In addition, a resilient member biasing the support member toward the rack is disposed within the boss of the bore or between the support member and the second bore so that the housing in either case requires modification to accommodate the resilient member and/or adjuster assembly.

SUMMARY OF THE INVENTION

The present invention provides a simple support member for yieldably resisting separation between a rack and a pinion while at the same time being disposed within a housing which does not require modification thereto. The housing includes a first bore rotatably receiving the pinion and a second bore movably receiving the rack. The support member defines an inner surface slidably engageable with the rack and an outer surface substantially matching a wall of the second bore. The support member is disposed within a clearance defined between the rack and the second bore. A pair of arms are integrally formed with the support member and each arm extends axially into the first bore. The arms oppose a wall of the first bore to fix the support member in light sliding engagement with the rack.

In one form of the invention, one of the arms is cut out to releasably carry a resilient member which is engageable with the second bore wall to bias the support member to pivot relative to the other arm. Another form of the invention provides an eccentric ring wedge slidably engaging the wall of the first bore and the other arm. The ring is biased to rotate within the first bore in response to clearances between the rack and the pinion in order to move the support and rack to an adjusted position taking up any clearances between the rack and the pinion. In both forms of the invention, the support member outer surface cooperates with the wall of the second bore to define a clearance therebetween.

The first bore receives a pair of bearing assemblies which cooperate with the wall of the first bore and the pinion to rotatably support the latter within the first bore. The bearing assemblies are engageable with a respective arm on the support member to fixedly position the support member and the rack within the second bore.

It is an object of the present invention to provide a support member in a rack and pinion assembly which is adapted to conform to the existing housing for the assembly and to yieldably resist separation between the rack and the pinion.

It is another object of the present invention to provide a pair of arms on the support member with one of the arms engageable with a resilient member so as to bias the support member to pivot relative to the other arm.

It is further object of the present invention to provide a ring which cooperates with the other arm to adjust the position of the support member in response to the amount of clearance between the rack and the pinion.

DETAILED DESCRIPTION

Figure 1:
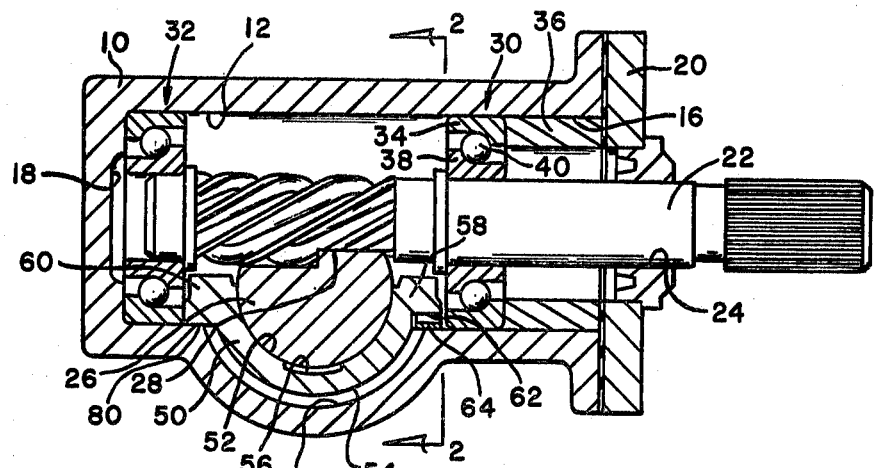
FIG. 1 is a side cross-sectional view of a rack and pinion assembly having a support member in accordance with the present invention.

In the rack and pinion assembly of FIG. 1 a housing 10 defines a first bore 12 and a second bore 14, which intersects the first bore 12. The first bore 12 leads from an opening 16 to an end wall 18. The opening 16 is closed by a plug 20. A pinion 22 is received within the first bore 12 and extends outwardly of the plug 20 via an aperture 24 on the plug. A rack 26 is disposed within the second bore 14 and is engageable via teeth 28 with the pinion 22. Consequently, rotation of the pinion 22 within first bore 12 causes the rack to move within second bore 14.

In order to rotationally support the pinion within the first bore 12, a pair of bearing assemblies 30 and 32 are disposed within the first bore. The bearing assembly 30 includes an outer race 34 which is tightly engaged with or press fitted on the wall of bore 12. A spacer 36 prevents movement of the outer race 34 to the right viewing FIG. 1. An inner race 38 of the bearing assembly 30 is engageable with the pinion 22 and a plurality of balls or rollers 40 provide for rotation of the inner race 38 relative to the outer race 34. The bearing assembly 32 is substantially a mirror image of the bearing assembly 30 so that the foregoing description is equally applicable to the bearing assembly 32.

In accordance with the invention, a support member 50 includes an inner surface 52 slidably engaging the rack 26 and on outer surface 54 substantially matching the contour of the wall of bore 14. As shown in FIG. 1, the outer surface 54 forms a clearance with the wall of the second bore 14. A central pocket 56 on the inner surface 52 may be provided to retain grease and also insure that the inner surface 52 slidably engages the rack at two areas on opposite sides of the central pocket. The support member 50 terminates in a first arm 58 adjacent the bearing assembly 30 and a second arm 60 adjacent the bearing assembly 32. Both arms extend axially into the bore 14 to oppose the wall of bore 14. The first arm 58 is cut out at 62 to receive a spring 64. The spring 64 releasably engages a tab 66 extending from the arm 58, so that the spring remains attached to the support member when the support member is separated from the housing. In the installed position, the spring 64 biases the arm 58 away from the wall of the first bore 12 adjacent bearing 30 so that the support member 50 is biased to pivot about the arm 60 which is resting on the wall of bore 12 adjacent bearing 32. Therefore, the spring 64 biases the support 50 and rack 26 toward pinion 22 to yieldably oppose separation between the rack and the pinion. The portion of arm 58 adjoining cutout 62 and the arm 60 include surfaces substantially matching the wall of bore 12.

The support member 50 is disposed between a clearance between the rack 26 and the wall of bore 12 while the pair of arms 58 and 60 are disposed within a clearance between the pinion and the wall of bore 12. In order to position the support member 50 and the rack 26 radially within bore 14 and axially relative to bore 12, the bearing assemblies 30 and 32 are engageable with the respective arms 58 and 60 to position the rack and support within the housing 10.

Figure 4:
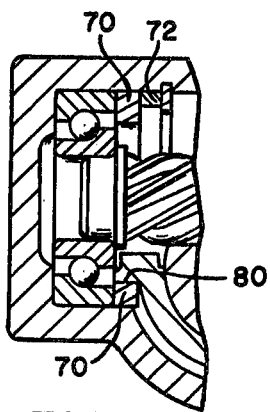
FIG. 4 is a view similar to FIG. 1, and including the adjustment ring of the present invention.

In FIG. 4 a wedge or eccentric ring 70 is disposed within the first bore 12 adjacent bearing assembly 32. The wedge slidably engages the wall of bore 12 and the arm 60 and is biased by suitable spring means 72 to rotate within the bore 12. In particular, the ring 70 includes a variable radial dimension such that a smaller radial dimension is initially engageable with the arm 60. As the teeth 28 on the rack (or corresponding teeth on the pinion) begin to wear a clearance may be established between the rack and the pinion. Apart from the action of the spring 64, the ring 70 will rotate within bore 12 to bring a larger radial dimension into engagement with the arm 60, thereby moving the arm 60, support member 50 and rack 26 closer toward the pinion 22 in order to take up the established clearance. In a similar manner, wear between the rack and support member 50 can be adjusted for by the ring 70.

Figure 2:
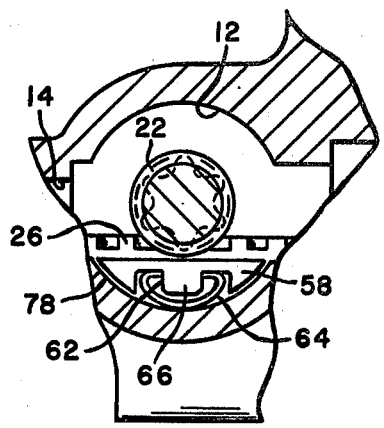
FIG. 2 is a cross-sectional view taken along line 2—2 of FIG. 1.
Figure 3:
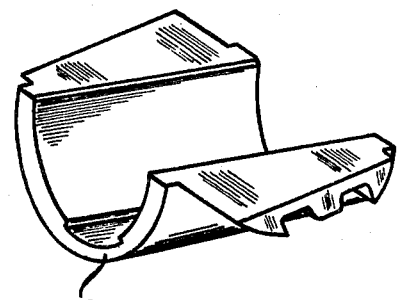
FIG. 3 is a perspective view of the support member shown in FIG. 1.

As shown in FIG. 2, the arm 58 forms an arcuate surface 78 substantially matching the wall of bore 12. Consequently, if the spring 64 is compressed in response to torque generated between the pinion and the rack, the surface 78 will uniformly contact the wall of bore 12 to prevent separation between the rack and the pinion. In a similar manner, the arm 60 forms an arcuate surface 80 substantially matching the wall of bore 12. With the embodiment of FIG. 1, the surface 80 fully contacts the wall of bore 12 while the embodiment of FIG. 4 provides for the surface 80 to fully contact the inner surface of ring 70. Because the radial thickness of ring 70 varies gradually from small at the bottom in FIG. 4 to large at the top in FIG. 4, the surface 80, when the ring 70 is used, will be suitably curved to accommodate the change in curvature for the inner surface of ring 70.

Although the foregoing description refers to the accompanying drawings, there are many modifications feasible by one skilled in the art and it is intended that all such modifications are covered by the scope of the appended claims.

I claim:

1. In a rack and pinion assembly, the combination of a housing having a first bore for receiving the pinion and a second bore for receiving the rack, the rack and pinion including teeth for coupling the rack to the pinion, and a support mounting the rack within the housing, the support including a first arm extending into the first bore and a second arm extending into the first bore, the first arm and the second arm being engageable with a wall of the first bore to maintain the support in engagement with the rack.

2. The rack and pinion assembly of claim 1 in which the first arm is located on one side of the rack and the second arm is located on the other side of the rack and said first and second arms cooperate with the wall of the first bore to maintain the support in spaced relation to a wall of the second bore.

3. The rack and pinion assembly of claim 1 in which a first bearing is disposed within the first bore on one side of the rack and a second bearing is disposed within the first bore on the other side of the rack, the first and second bearings rotatably mounting the pinion within the first bore, the first arm being disposed within the first bore adjacent the first bearing and the second arm being disposed within the first bore adjacent the second bearing and said first and second bearings cooperating with the support to position the latter within the second bore.

4. In a rack and pinion assembly having a housing rotatably supporting the pinion and movably supporting the rack, the housing defining a pair of bearing surfaces on opposite sides of the rack for carrying a pair of bearing assemblies, said pair of bearing assemblies cooperating with the pinion to rotatably support the latter within the housing, and a support within the housing substantially retaining the rack in engagement with the pinion, characterized by said support being mounted on said bearing surfaces, said support being engageable with said pair of bearing assemblies to substantially fix said support relative to said pair of bearing assemblies.

5. The rack and pinion assembly of claim 4 in which said support includes a first arm engaging said bearing surface adjacent one of said bearing assemblies and a second arm engaging said bearing surface adjacent the other bearing assembly, and said first arm cooperates with a resilient member to pivot said support relative to said second arm toward said rack.

6. In a rack and pinion assembly having a housing which is manufactured to define a first bore for rotatably receiving the pinion and a second bore for movably receiving the rack, and a support for retaining the rack in engagement with the pinion, said support having an arcuate surface substantially matching with a wall of the second bore, said support including a pair of arms which extend into the first bore, said pair of arms defining surfaces which oppose a wall of the first bore to mount said support within the housing and said support fitting within said housing in the absence of further modification beyond said manufacture for said first and second bores.

7. A support member for a rack and pinion assembly having a housing receiving the pinion in a first bore and receiving the rack in a second bore, said support member having an inner surface slidably engageable with the rack and opposing separation between the rack and the pinion, said support having an outer surface substantially matching a wall of said second bore, said support including a pair of arms extending axially into said first bore and each of said pair of arms including surfaces opposing a wall of said first bore in order to fix said support member axially relative to said second bore and also to carry said support member in spaced relation to the wall of said second bore.

8. In a rack and pinion assembly, the combination of a housing having a first bore for receiving the pinion and a second bore for receiving the rack, the rack and pinion including teeth for coupling the rack to the pinion, and a support mounting the rack within the housing, the support including a first arm extending into the first bore and a second arm extending into the first bore, the first arm and the second arm being engageable with a wall of the first bore to maintain the support in engagement with the rack, the first arm being located on one side of the rack and the second arm being located on the other side of the rack, one of the arms cooperating with a resilient member to bias the support to pivot relative to the other arm, and the resilient member is releasably coupled to the one arm.

9. In a rack and pinion assembly, the combination of a housing having a first bore for receiving the pinion and a second bore for receiving the rack, the rack and pinion including teeth for coupling the rack to the pinion, and a support mounting the rack within the housing, the support including a first arm extending into the first bore and a second arm extending into the first bore, the first arm and the second arm being engageable with a wall of the first bore to maintain the support in engagement with the rack, a wedge cooperating with one of the arms to adjust the position of the support and rack relative to the pinion in response to clearances between the rack and the pinion.

10. In a rack and pinion assembly having a housing rotatably supporting the pinion and movably supporting the rack, the housing defining a pair of bearing surfaces on opposite sides of the rack for carrying a pair of bearing assemblies, and a support within the housing substantially retaining the rack in engagement with the pinion, characterized by said support being mounted on said bearing surfaces, said support being engageable with said pair of bearing assemblies to substantially fix said support relative to said pair of bearing assemblies, said support including a first arm engaging said bearing surface adjacent one of said bearing assemblies and a second arm engaging said bearing surface adjacent the other bearing assembly, said first arm cooperates with a resilient member to pivot said support relative to said second arm toward said rack and said second arm cooperates with adjustment means to take up clearances between said rack and said pinion.

11. In a rack and pinion assembly having a housing defining a first bore for rotatably receiving the pinion and a second bore for movably receiving the rack, and a support for retaining the rack in engagement with the pinion, said support having an arcuate surface substantially matching with a wall of the second bore, said support including a pair of arms which extend into the first bore, said pair of arms defining arcuate surfaces which oppose a wall of the first bore to mount said support within the housing, one of said pair of arms being cut out to receive a resilient member and said resilient member cooperates with the wall of said first bore to bias said support to pivot relative to the other arm.

12. In a rack and pinion assembly having a housing defining a first bore for rotatably receiving the pinion and a second bore for movably receiving the rack, and a support for retaining the rack in engagement with the pinion, said support having an arcuate surface substantially matching with a wall of the second bore, said support including a pair of arms which extend into the first bore, said pair of arms defining arcuate surfaces which oppose a wall of the first bore to mount said support within the housing, a ring carried within the first bore, said ring extending between the wall of the first bore and one of said pair of arms, and said ring slidably engaging said one arm and said first bore wall to move relative thereto whereby said support and said rack are movable relative to said pinion in response to movement of said ring.

13. A support member for a rack and pinion assembly having a housing receiving the pinion in a first bore and receiving the rack in a second bore, said support member having an inner surface slidably engageable with the rack and opposing separation between the rack and the pinion, said support having an outer surface substantially matching a wall of said second bore, said support including a pair of arms extending axially into said first bore and each of said pair of arms including surfaces opposing a wall of said first bore in order to fix said support member axially relative to said second bore, one of said pair of arms being cut out to receive a resilient member and said resilient member is engageable with the wall of said first bore to bias said support member to pivot relative to said other arm.

14. In a rack and pinion assembly having a housing defining a first bore for rotatably receiving the pinion and a second bore for movably receiving the rack, a support disposed within the housing, the support engaging the rack to resist separation between the rack and pinion, characterized by said support including a pair of arms extending into said first bore and opposing a wall of said first bore, said pair of arms cooperating with the wall of said first bore to substantially fix said support within said second bore when said rack is moving within said second bore.

* * * * *